(12) United States Patent
Burr

(10) Patent No.: US 8,294,110 B2
(45) Date of Patent: Oct. 23, 2012

(54) METHOD FOR IMPROVED CORRECTION OF SIPM NON-LINEARITY IN MULTIPLEXED RADIATION DETECTORS

(75) Inventor: Kent C. Burr, Buffalo Grove, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/045,610

(22) Filed: Mar. 11, 2011

(65) Prior Publication Data

US 2012/0228484 A1    Sep. 13, 2012

(51) Int. Cl.
    *G01T 1/164* (2006.01)
(52) U.S. Cl. ........... 250/363.09; 250/252.1; 250/370.09; 382/131; 702/40
(58) Field of Classification Search ............... 250/252.1, 250/363.04, 363.07, 363.09, 370.09; 382/131, 382/132; 702/40
    See application file for complete search history.

(56) References Cited

U.S. PATENT DOCUMENTS

| | | | | |
|---|---|---|---|---|
| 4,323,977 | A * | 4/1982 | Arseneau | 382/275 |
| 2005/0023733 | A1 * | 2/2005 | Burr | 264/400 |
| 2006/0011853 | A1 * | 1/2006 | Spartiotis et al. | 250/370.13 |
| 2007/0235657 | A1 * | 10/2007 | He et al. | 250/389 |

OTHER PUBLICATIONS

Kent C. Burr and Gin-Chung Wang, "Scintillation Detection Using 3 mm×3 mm Silicon Photomultipliers", Nuclear Science Symposium Conference Record, 2007. NSS '07. IEEE, vol. 2, Oct. 26, 2007-Nov. 3, 2007, p. 975-982.

Chang L. Kim and David L. McDaniel, "High Spatial Resolution Detector Using an 8×8 MLS crystal array and a quad anode photomultiplier", Nuclear Science Symposium Conference Record, 2002 IEEE, vol. 3, Nov. 10-16, 2002, p. 1665-1669.

Kent C. Burr, Adrian Ivan, James LeBlanc, Scott Zelakiewicz, David L. McDaniel, Chang L. Kim, Alesander Ganin, Kanai S. Shah, Ron Grazioso, Richard Farrell, and Jarek Glodo, "Evaluation of a Position Sensitive Avalanche Photodiode for PET," IEEE Transactions on Nuclear Science, vol. 50, No. 4, Aug. 2003, p. 792-796.

Adrian Ivan, Kent C. Burr, Yiping Shao, and James W. LeBlanc, "Depth of Interaction Effect on Timing Resolution in PET Block Detectors", Nuclear Science Symposium Conference Record, 2004 IEEE vol. 7, Oct. 16-22, 2004 pp. 4156-4158.

Kent C. Burr, Adrian Ivan, Gin-Chung. Wang, James W. LeBlanc, Mickel A. McClish, Richard Farrell, Kanai S. Shah, "Design of High Resolution PET Detectors Using Avalanche Photodiodes", Nuclear Science Symposium Conference Record, 2005 IEEE vol. 5, Oct. 23-29, 2005, p. 2794-2798.

* cited by examiner

*Primary Examiner* — David Porta
*Assistant Examiner* — Casey Bryant
(74) *Attorney, Agent, or Firm* — Oblon, Spivak, McClelland, Maier & Neustadt, L.L.P.

(57) ABSTRACT

A system and method for determining correction factors used to determine energy of an event detected by a gamma ray detector having nonlinear photosensors arranged over a scintillation array of crystal elements, the gamma ray detector using optical multiplexing or analog electronic multiplexing. The method includes acquiring, for each nonlinear photosensor, a signal value generated by the nonlinear photosensor in response to receiving scintillation light emitted by a crystal in the array of crystal elements in response to arrival of a gamma ray; and determining a relative position of the event, the relative position being one of a predetermined number of cell locations, the predetermined number of cell locations being greater than a number of crystal elements in the array of crystal elements; and determining, for each cell location, a correction factor based on an average total signal value and a predetermined energy value of the gamma ray.

18 Claims, 14 Drawing Sheets

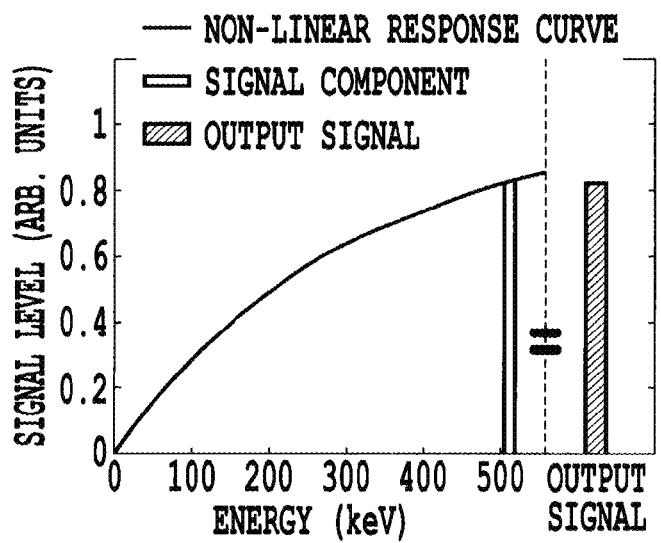
*Fig. 2B(1)*
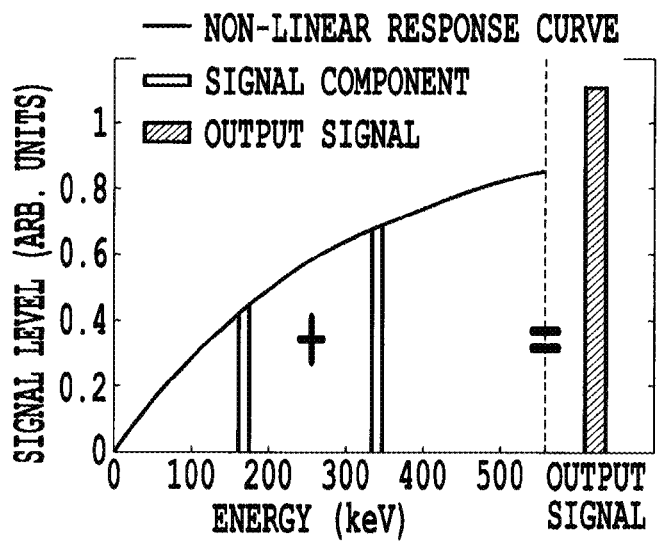
*Fig. 2B(2)*

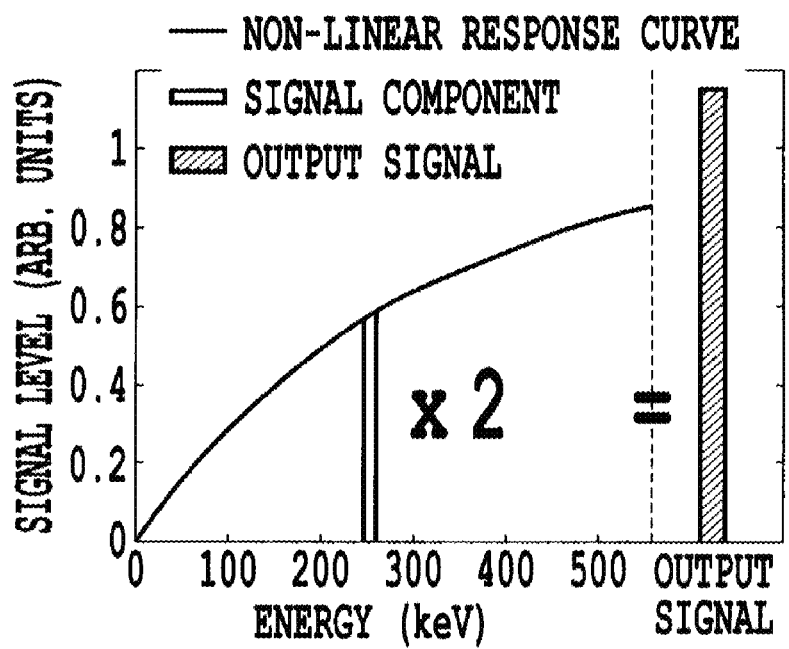
*Fig. 2B(3)*

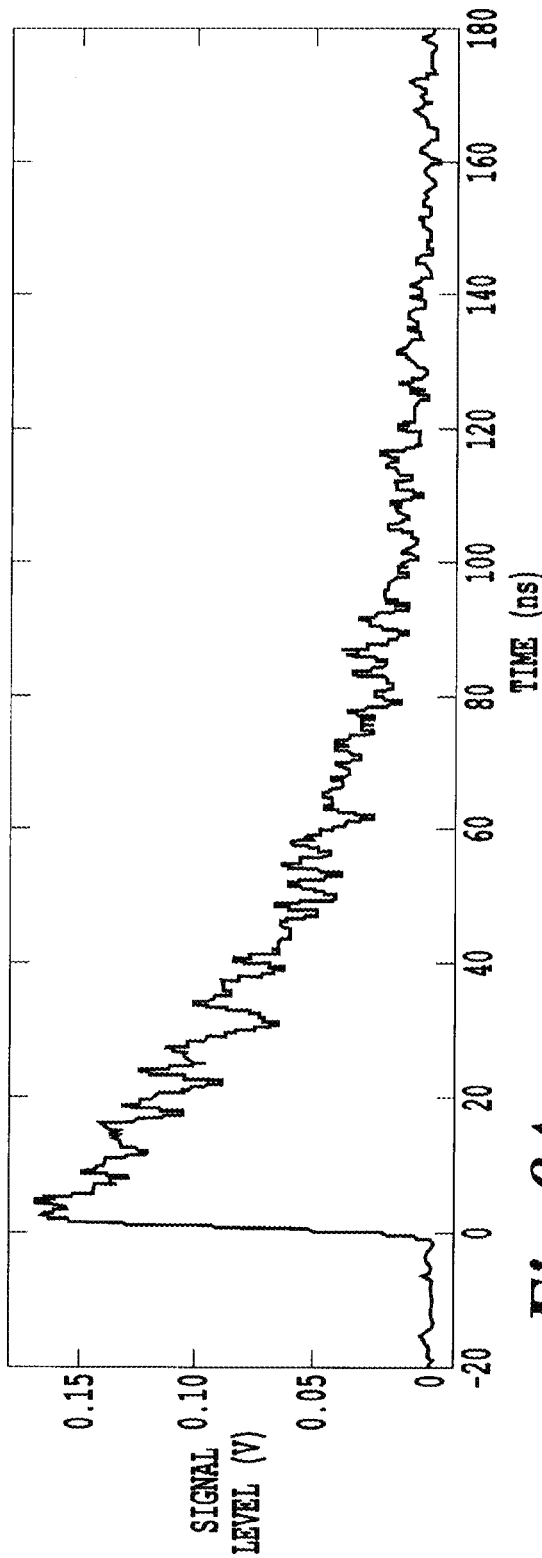
Fig. 8A
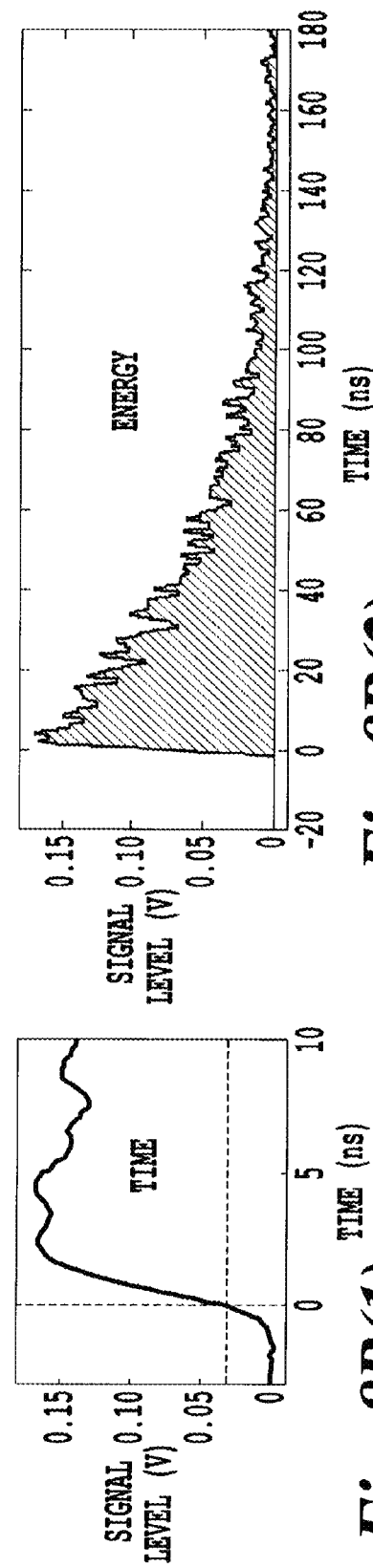
Fig. 8B(1)
Fig. 8B(2)

METHOD FOR IMPROVED CORRECTION OF SIPM NON-LINEARITY IN MULTIPLEXED RADIATION DETECTORS

FIELD

Embodiments disclose herein generally relate to a method for the improved correction of SiPM nonlinearity in multiplexed radiation detectors. In particular, embodiments disclosed herein relate to radiation detectors, such as for PET, that use photosensors that exhibit significant non-linearity and for which the degree of non-linearity is dependent on the spatial distribution of the photon flux on the surface of the photosensor. Specifically, embodiments disclosed herein provide an improved method for implementing non-linearity corrections in detectors which use optical or analog electronic multiplexing to reduce the required number of electronics channels.

BACKGROUND

The use of gamma ray detectors in general, and positron emission tomography (PET) in particular, is growing in the field of medical imaging. In PET imaging, a radiopharmaceutical agent is introduced into the object to be imaged via injection, inhalation, or ingestion. After administration of the radiopharmaceutical, the physical and bio-molecular properties of the agent will cause it to concentrate at specific locations in the human body. The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays (at 511 keV) traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The collection of a large number of events creates the necessary information for an image of an object to be estimated through tomographic reconstruction. Two detected events occurring at substantially the same time at corresponding detector elements form a line-of-response that can be histogrammed according to their geometric attributes to define projections, or sinograms to be reconstructed. Events can also be added to the image individually.

The fundamental element of the data collection and image reconstruction is therefore the LOR, which is the line traversing the system-patient aperture. Additional information can be obtained regarding the location of the event. First, it is known that, through sampling and reconstruction, the ability of the system to reconstruct or position a point is not space-invariant across the field of view, but is better in the center, slowly degrading toward the periphery. A point-spread-function (PSF) is typically used to characterize this behavior. Tools have been developed to incorporate the PSF into the reconstruction process. Second, the time-of-flight, or time differential between the arrival of the gamma ray on each detector involved in the detection of the pair, can be used to determine where along the LOR the event is more likely to have occurred.

The above described detection process must be repeated for a large number of annihilation events. While each imaging case must be analyzed to determine how many counts (i.e., paired events) are required to support the imaging task, current practice dictates that a typical 100-cm long, FDG (fluorodeoxyglucose) study will need to accumulate several hundred million counts. The time required to accumulate this number of counts is determined by the injected dose of the agent and the sensitivity and counting capacity of the scanner.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. The use of partial rings and rotation of the detector to capture missing angles is also possible, but these approaches have severe consequences for the overall sensitivity of the scanner. In a cylindrical geometry, in which all gamma rays included in a plane have a chance to interact with the detector, an increase in the axial dimension has a very beneficial effect on the sensitivity or ability to capture the radiation. Thus, the best design is that of a sphere, in which all gamma rays have the opportunity to be detected. Of course, for application to humans, the spherical design would have to be very large and thus very expensive. Accordingly, a cylindrical geometry, with the axial extent of the detector being a variable, is realistically the starting point of the design of a modern PET scanner.

Once the overall geometry of the PET scanner is known, another challenge is to arrange as much scintillating material as possible in the gamma ray paths to stop and convert as many gamma rays as possible into light. In order to be able to reconstruct the spatio-temporal distribution of the radio-isotope via tomographic reconstruction principles, each detected event will need to be characterized for its energy (i.e., amount of light generated), its location, and its timing. Most modern PET scanners are composed of several thousand individual crystals, which are arranged in modules and are used to identify the position of the scintillation event. Typically crystal elements have a cross section of roughly 4 mm×4 mm. Smaller or larger dimensions and non-square sections are also possible. The length or depth of the crystal will determine how likely the gamma ray will be captured, and typically ranges from 10 to 30 mm. The detector module is the main building block of the scanner.

PET imaging relies on the conversion of gamma rays into light through fast and bright scintillation crystals. After determining the interaction position in the scintillator and time pairing of individual events, the location of the annihilation process can be recreated. These actions require very fast components—detector and electronics—and they also require excellent signal to noise ratio. With high quality electronics, the signal to noise ratio is mainly determined by the inherent Poisson statistics involved in the detection process. Detecting more photons will result in improved signal-to-noise-ratio, and, therefore, better spatial and timing resolution. No improvement in detector design and electronics can compensate for significant loss of light in the detection process. The fraction of the total amount of light collected (relative to the amount created in the scintillator) is a good measure of the efficiency of the design. So to maximize the amount of light collected, one would try to get the light sensor as close as possible to the scintillation crystal and avoid reflections and other edge effects. This would then force the arrangement to be large array detector with short distance between crystal and sensor.

As described above, a PET imaging system is more than just a counter and, in addition to detecting the presence of a scintillation event, the system must identify its location. Conceptually, perhaps the most straightforward design to allow identification of the location of each interaction is to have a separate photosensor and data acquisition channel for each scintillator crystal. Due to constraints such as the physical size of common photosensors, the power required for each data acquisition channel, and the associated cost of these items, some form of multiplexing is usually used to reduce the number of photosensors and channels of electronics.

The two most common forms of multiplexing are optical multiplexing (light sharing) or analog electronic multiplexing (resistive charge-sharing networks). Examples of light sharing include PET "block" detectors that use a light guide to spread light over four PMTs. By properly documenting how light is being distributed to the multiple light sensors, it is possible to assign an event location for any given set of sensor responses. So-called position sensitive avalanche photodiodes (PSAPDs) or position sensitive SiPMs are example of photosensors which use analog electronic multiplexing.

For either light-sharing or charge-sharing designs, the relative position of each event is calculated using Anger logic (centroid calculation) or statistical methods. To determine the crystal of interaction, usually the resulting flood histogram is segmented into a crystal look-up table. After the crystal of interaction is identified from the position in the flood histogram and the look-up table, energy and timing corrections are applied on a crystal-by-crystal basis. The energy correction can include a non-linearity correction. This correction is usually based on measurements with a number of different isotopes (for example, $^{22}$Na for 511 and 1275 keV, $^{137}$Cs for 662 keV, $^{133}$Ba for 356 keV, $^{57}$Co for 122 keV, and $^{241}$Am for 60 keV), and is applied on a crystal-by-crystal basis.

FIG. 1 shows an example of the non-linearity observed when a 3 mm×3 mm×10 mm LYSO crystal is coupled to a 3 mm×3 mm SiPM (from Hamamatsu) containing 3600 cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2B illustrates an example of the approximate signal levels that would be generated for the three cases shown in FIG. 2A, in which although 511 keV is deposited in each case, the resulting output signal level varies for each case;

FIGS. 8A and 8B illustrate a typical pulse from a photosensor in response to receiving light causes by a gamma ray striking a crystal array, and the derivation of timing and energy information;

DETAILED DESCRIPTION OF THE PREFERRED EMBODIMENTS

Figure 1:
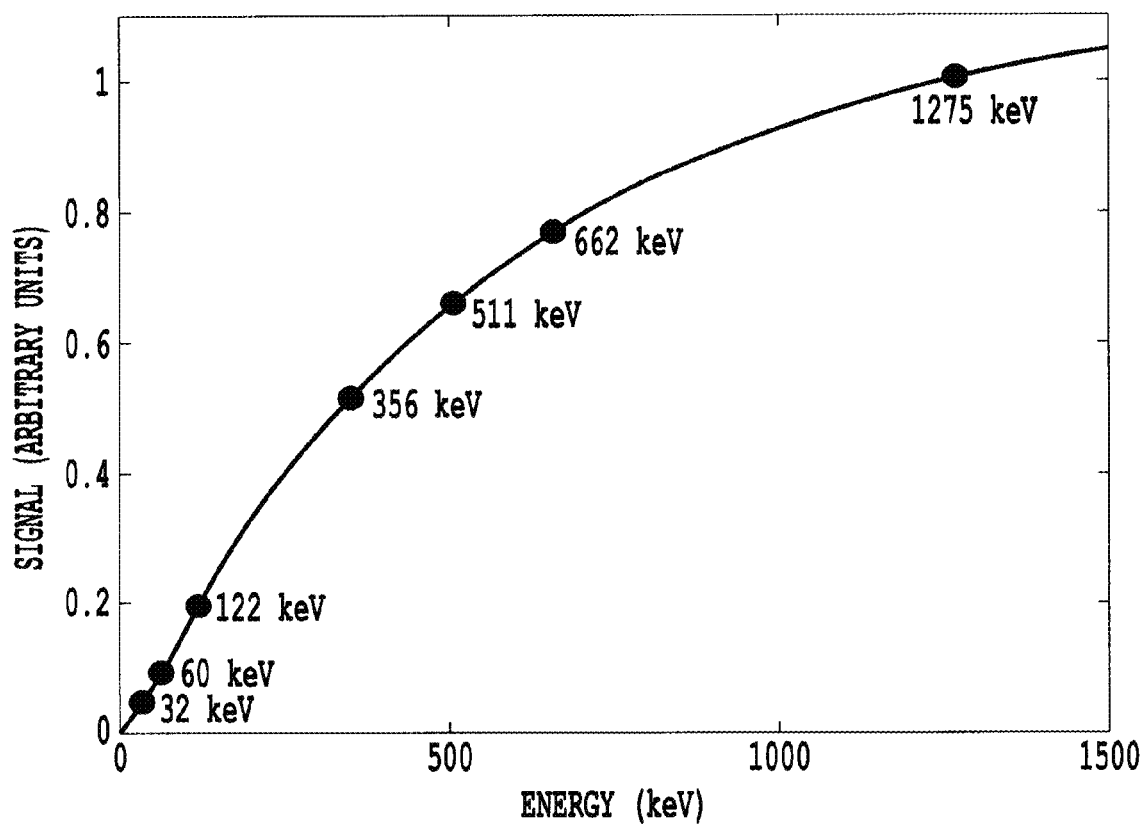
FIG. 1 illustrates an example of the non-linearity of the SiPM response in which a 3 mm×3 mm×10 mm LYSO crystal was coupled to a 3 mm×3 mm SiPM containing 3600 cells and the detector is exposed to gamma rays from a variety of radioactive isotopes.

According to one embodiment, there is provided a method for determining correction factors used to determine the energy of an event detected by a gamma ray detector having at least one nonlinear photosensor arranged over a scintillation array of crystal elements, the gamma ray detector using optical multiplexing or analog electronic multiplexing, the method comprising: (a) generating gamma rays having a first predetermined energy value; (b) acquiring, for each of the at least one nonlinear photosensor, a corresponding signal value generated by the at least one nonlinear photosensor in response to receiving scintillation light emitted by at least one crystal in the array of crystal elements in response to arrival of one of the generated gamma rays, which signifies an event; (c) determining a relative position and a total signal value of the event based on the acquired signal value of each of the at least one nonlinear photosensor, the relative position being one of a predetermined number of cell locations, the predetermined number of cell locations being greater than a number of crystal elements in the array of crystal elements; (d) storing the total signal value in association with the determined cell location; (e) repeating the acquiring, determining, and storing steps for a plurality of events to generate stored event data; (f) determining, for each cell location, an average total signal value for the first predetermined energy value based on the stored event data; and (g) determining, for each cell location, a correction factor based on the determined average total signal value and the first predetermined energy value.

According to one aspect of the embodiments described herein, the method further comprises
(1) generating second gamma rays having a second predetermined energy value; (2) repeating steps (a)-(g) to determine, for each cell location, a second correction factor corresponding to the second predetermined energy value; and (3) storing, for each cell location, each determined correction factor in association with the corresponding predetermined energy value.

According to another aspect, the method further comprises determining, for each cell location, a nonlinear relationship between signal value and energy value, based on the stored correction factors.

According to still another aspect, the step of determining the relative position comprises determining one of the predetermined number of cell locations to correspond to the relative position.

According to still another aspect, the step of determining the relative position includes (1) calculating a weighted average based on x-y positions of each of the at least one nonlinear photosensor that receives the scintillation light corresponding to the event, the average being weighted by the corresponding acquired signal value of each of the at least one nonlinear photosensor that receives the scintillation light corresponding to the event; and (2) determining the total signal value by summing the acquired signal values of each of the at least one nonlinear photosensor.

According to still another aspect, the step of determining the correction value comprises determining the correction value corresponding to the first predetermined energy value for each cell location as a ratio of the first predetermined energy value and the determined average total signal value for the cell location.

According to still another aspect, the at least one nonlinear photosensor includes at least one silicon photomultiplier.

According to another embodiment, there is provided a computer-readable medium storing a computer program, which when executed by a computer, causes the computer to determine correction factors used to determine the energy of an event detected by a gamma ray detector having at least one nonlinear photosensor arranged over a scintillation array of crystal elements, the gamma ray detector using optical multiplexing or analog electronic multiplexing, the program causing the computer to perform the steps of: (1) receiving, for each of the at least one nonlinear photosensor, a corresponding signal value generated by the at least one nonlinear photosensor in response to receiving scintillation light emitted by at least one crystal in the array of crystal elements in response to arrival of a gamma ray having a first predetermined energy value, which signifies an event; (2) determining a relative position and a total signal value of the event based on the acquired signal value of each of the at least one nonlinear photosensor, the relative position being one of a predetermined number of cell locations, the predetermined number of cell locations being greater than a number of crystal elements in the array of crystal elements; (3) storing the total signal value in association with the determined cell location; (4) repeating the receiving, determining, and storing steps for a plurality of events to generate stored event data; (5) determining, for each cell location, an average total signal value for the first predetermined energy value based on the stored event data; and (6) determining, for each cell location, a correction factor based on the determined average total signal value and the first predetermined energy value.

According to another embodiment, there is provided a method for determining a corrected energy value corresponding to an event detected by a gamma ray detector having at least one nonlinear photosensor arranged over a scintillation array of crystal elements, comprising: (1) generating a plurality of gamma rays; (2) acquiring, for each of the at least one nonlinear photosensor, a corresponding signal value generated by the at least one nonlinear photosensor in response to receiving scintillation light emitted by at least one crystal in the array of crystal elements in response to arrival of one of the generated gamma rays, which signifies an event; (3) determining a relative position and a total signal value of the event based on the acquired signal value of each of the at least one nonlinear photosensor, the relative position being one of a predetermined number of cell locations, the predetermined number of cell locations being greater than a number of crystal elements in the array of crystal elements; and (4) calculating the corrected energy value for the event based on the total signal value and stored calibration data for the cell location corresponding to the determined relative position, the stored calibration data defining a nonlinear relationship between signal value and energy value for each cell location.

According to another embodiment, there is provided a computer-readable medium storing a computer program, which when executed by a computer, causes the computer to determine a corrected energy value corresponding to an event detected by a gamma ray detector having at least one nonlinear photosensor arranged over a scintillation array of crystal elements, the program causing the computer to perform the steps of: (1) receiving, for each of the at least one nonlinear photosensor, a corresponding signal value generated by the at least one nonlinear photosensor in response to receiving scintillation light emitted by at least one crystal in the array of crystal elements in response to arrival of a gamma ray, which signifies an event; (2) determining a relative position and a total signal value of the event based on the acquired signal value of each of the at least one nonlinear photosensor, the relative position being one of a predetermined number of cell locations, the predetermined number of cell locations being greater than a number of crystal elements in the array of crystal elements; and (3) calculating the corrected energy value for the event based on the total signal value and stored calibration data for the cell location corresponding to the determined relative position, the stored calibration data defining a nonlinear relationship between signal value and energy value for each cell location.

According to another embodiment, there is provided, a method for determining correction factors used to determine energy of an event detected by a gamma ray detector having at least one nonlinear photosensor arranged over a scintillation array of crystal elements, the gamma ray detector using optical multiplexing or analog electronic multiplexing, the method comprising: (a) generating gamma rays having a first predetermined energy value; (b) acquiring, for each of the at least one nonlinear photosensor, a corresponding signal value generated by the at least one nonlinear photosensor in response to receiving scintillation light emitted by at least one crystal in the array of crystal elements in response to arrival of one of the generated gamma rays, which signifies an event; (c) determining a relative position and a total signal value of the event based on the acquired signal value of each of the at least one nonlinear photosensor; (d) storing the total signal value in association with the determined relative position; (e) repeating the acquiring, determining, and storing steps for a plurality of events to generate stored event data; and (f) determining, based on the stored event data and the first predetermined energy value, parameters of a mathematical correction function that varies continuously as a function of position within the array of crystal elements, the mathematical correction function representing a spatial variation in the total signal value of the acquired events.

Further, the method of this embodiment includes determining, for each event, an energy of the event using the determined mathematical correction function and the determined relative position of the event.

For high-energy gamma detection (such as 511 keV for PET), Compton scatter within the detector often results in significant energy deposition in multiple scintillation crystals. Generally, more than 30% of detected 511 keV gamma rays deposit energy in multiple crystals. Therefore, for the same total energy deposited in the scintillator, the flux density of optical photons at the photosensor can vary significantly depending on the precise interaction processes and the number of crystals involved. For example, comparing the case of 511 keV deposited in a single crystal or a total of 511 keV deposited in two neighboring crystals, there will be a large difference in optical flux density at the photosensor.

This difference in optical flux density can present problems for non-linearity correction in photosensors where the degree of non-linearity depends on the specific spatial distribution of the detected optical photons. This is the case for so-called SiPMs. An SiPM, or silicon photomultiplier (also called SSPM for solid state photomultiplier, or GAPD or MAPD) consists of an array of many independent avalanche photodiodes, referred to as "micro-cells" that are operated in Geiger mode. In Geiger mode, the micro-cell can be discharged by the detection of one or more photons, and the electrical charge released during the discharge is determined by the capacitance of the micro-cell and the operating voltage. The electrical charge released is independent of the number of photons that cause the discharge. When a pulse of light, such as from a scintillation event resulting from the interaction of a gamma ray in a scintillator crystal, strikes the SiPM, a number of the micro-cells will discharge, resulting in an electrical pulse. The amplitude of the pulse is proportional to the number of micro-cells that are discharged. If the photon flux is very low, the amplitude of the electrical pulse will vary linearly with the number of photons in the light pulse because the probability of multiple photons hitting the same micro-cell will be very small. As the light intensity increases, the non-linearity of the signal increases because the probability of multiple hits within the same micro-cell increases.

Figure 2A:
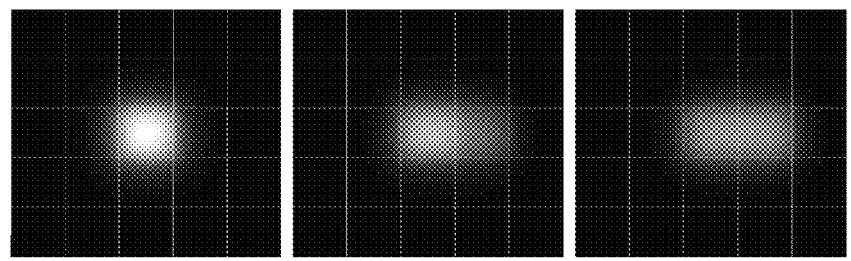
FIG. 2A illustrates three examples of light distribution emitted from a 5×5 scintillator array coupled to a thin light guide in which the integrated light intensity is identical, but the flux density varies considerably, so that a single non-linearity correction based on the identified crystal-of-interaction would not be sufficient.

FIG. 2A shows the variation in light intensity that might be expected for three different events which deposit 511 keV in a scintillator array. In this example, the scintillator crystals in the 5×5 array are optically isolated (i.e., they have reflector material between the individual elements) and are coupled to a thin light guide, which is then coupled to an array of photosensors or a position-sensitive photosensor. The grid lines in FIG. 2A indicate the boundaries of the scintillator crystals. In each case, the integrated light intensity is identical. In the first (leftmost) case, all of the energy is deposited in the central crystal, and the peak light intensity (or photon flux) is highest. In the second case, the gamma ray deposits 67% of its energy in the central crystal (by way of Compton scatter) and the remaining 33% of its energy in a neighboring crystal. In the third case (rightmost), the energy from the gamma ray is equally distributed between two crystals. In this case, the resulting maximum local intensity is lowest. If a photosensor, such as an SiPM, which demonstrates non-linearity that is dependent on the local photon flux, is used for reading-out this detector, then the contribution from non-linearity would be different in the three cases shown. The result would be degraded energy resolution. For example, in the example shown in FIG. 2A, even though 511 keV was deposited in each case, the non-linearity-corrected signal level for each of the three cases would be different (assuming that the same non-linearity correction is applied in each case). This represents an additional broadening mechanism which degrades the energy resolution.

FIG. 2B shows the approximate signal levels that would be generated by the three cases shown in FIG. 2A. For simplicity, only the contributions from at most two pixels are shown. Because of the difference in the flux levels and the non-linearity of the SiPM, even though all three cases deposit a total of 511 keV in the detector, the integrated or total signal levels in each case are different.

Embodiments disclosed herein apply a non-linearity correction on a sub-pixel or continuous basis. The use of optical multiplexing (e.g., light sharing) or analog electronic multiplexing (e.g., resistive network) provides additional information about multi-crystal interactions based on the placement of events in the flood histogram relative to the peaks corresponding to individual crystals. Because the hit positions in the flood histogram are calculated based on Anger logic (centroid calculation), events which deposit energy in two crystals will be placed between the peaks corresponding to the two individual crystals. As one of ordinary skill in the art will recognize, the calculated hit positions in these cases do not necessarily correspond to single physical locations, rather they are a representation of the relative signal levels generated by the photosensors.

Furthermore, ignoring effects from noise, the exact location between the individual crystal peaks will depend on the relative energy deposited in the two crystals. The variation in non-linearity is also governed by the relative energy deposited in the two crystals. Therefore, by sub-pixelating the flood histogram and applying a different non-linearity correction to each sub-pixel region, a better non-linearity correction can be obtained. Alternatively, a non-linearity correction which varies continuously between individual crystal peaks can be applied.

Figure 3:
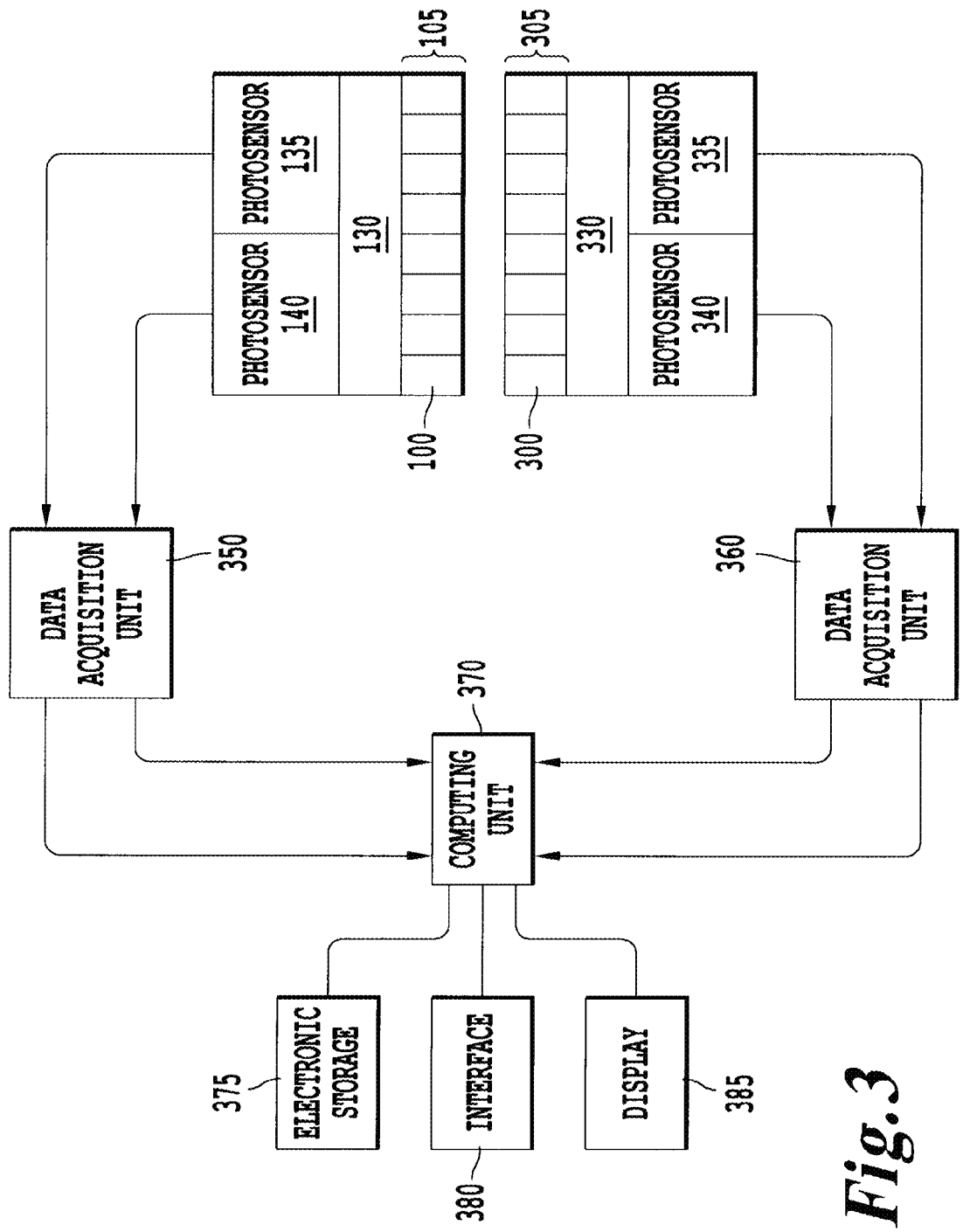
FIG. 3 is a drawing of a gamma ray detection system according to an exemplary embodiment.

FIG. 3 is a schematic drawing of a gamma ray detection system according to an exemplary embodiment. As one of ordinary skill will recognize, the gamma ray detection system of FIG. 3 may form part of a positron emission tomography (PET) system or a Time-of-Flight PET system. Further discussion of PET and Time-of-Flight PET systems is omitted for brevity. However, a discussion of Time-of-Flight PET systems may be found in "Time of Flight in PET Revisited," by W. W. Moses, *IEEE Transactions on Nuclear Science*, Vol. 50, No. 5, pp. 1325-1330, the entire contents of which are incorporated herein by reference.

In FIG. 3, nonlinear photosensors 135 and 140 are arranged over light guide 130, and the array of scintillation crystals 105 is arranged beneath the light guide 130. One skilled in the art would recognize that the invention could be applied to detectors using any nonlinear photosensors, including silicon photomultipliers (SiPMs), or arrays of SiPMs. A second array of scintillation crystals 305 is disposed opposite to the scintillation crystal array 105 with light guide 330 and photosensors 335, 340 arranged thereover.

In FIG. 3, when gamma rays are emitted from a body under test (not shown), the gamma rays travel in opposite directions, approximately 180° from each other. Gamma ray detection occurs nearly simultaneously at crystal of interaction 100 and crystal of interaction 300, and a scintillation event 110 is determined when the gamma rays are detected at crystal of interaction 100 and crystal of interaction 300 within a predefined time limit. Thus, the gamma ray detection system detects gamma rays nearly simultaneously at crystals of interaction 100 and 300. However, for simplicity only gamma detection at crystal of interaction 100 is described herein. One of ordinary skill in the art will recognize, however, that the description given with respect to crystal of interaction 100 is equally applicable to gamma ray detection at crystal of interaction 300.

Returning to FIG. 3, each photosensor 135, 140, 335 and 340 is connected to a data acquisition unit 350 or 360. The data acquisition units 350 and 360 generate a digitized output value by integrating a corresponding waveform generated by the photosensors 140, 135, 340 and 335 in response to the scintillation light.

Data acquisition units 350 and 360 may include analog-to-digital converters, such as sigma-delta converters operating at sampling rates between one gigahertz and five gigahertz. Alternatively, data acquisition units 350 and 360 may also include multi-threshold samplers that sample the photosensor waveforms using voltage-threshold triggers rather than a constant sampling rate. As one of ordinary skill in the art will recognize, other sampling methods and data acquisition devices are also possible without departing from the scope of the present embodiments. For example, separate energy and timing channels can be used. In this case, typically the energy channel uses a shaping filter and a lower-sampling-rate analog-to-digital converter. The timing channel typically sums the signals from multiple photosensors. The summed timing signal is then input into a comparator, and a time-to-digital convertor generates a time-stamp for the arrival of each event.

After the output values are acquired, they are provided to computing unit 370 for processing to determine the crystal of interaction and the energy level of the annihilation event according to the method described in detail below. The output values and time of arrivals are then stored in electronic storage 375 and can be displayed on display 385. Interface 380 may be used to configure and/or control the computing unit 370 and/or provide further instruction to the central processing unit 370.

As one skilled in the art would recognize, display 385 may be a cathode ray tube display (CRT), liquid crystal display (LCD) and the like. Interface 380 may be a keyboard, mouse, trackball, microphone, touch screen, or any other known device for interfacing with a central processing unit. One of ordinary skill will also recognize that the electronic storage 375 may be a hard disk drive, CD-ROM, DVD disk, FLASH memory, or another central processing unit. Further, electronic storage 375 may be removable or detachable from computing unit 370 or may be affixed thereto. Electronic storage 375 may also be connected to the computing unit via a network, and may therefore be located in a separate room, building or other location relative to the computing unit 370.

Figure 4:
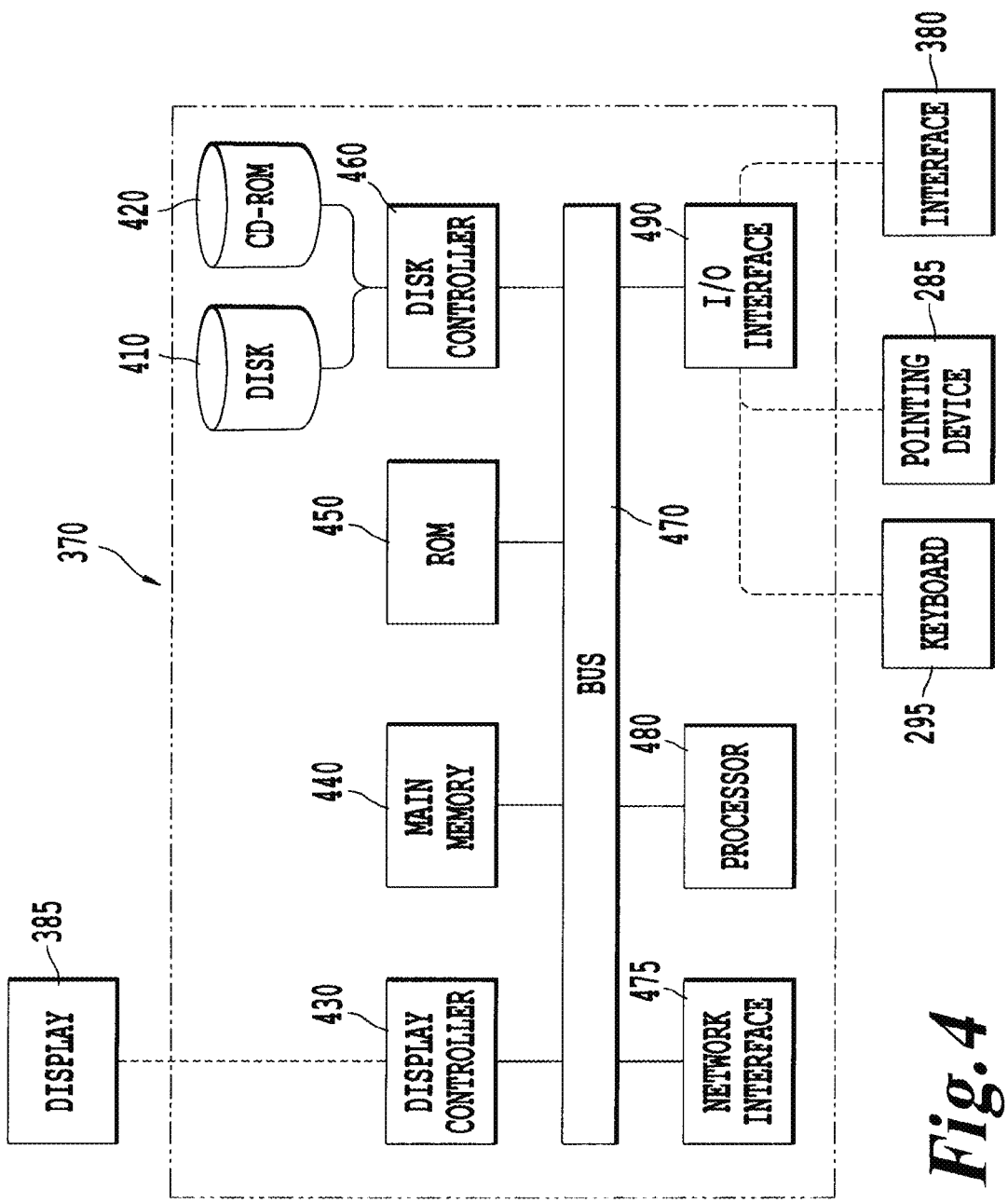
FIG. 4 is a block diagram of the central processing unit in the gamma ray detector system according to an exemplary embodiment.

FIG. 4 is a block diagram of the computing unit 370 according to an exemplary embodiment. The computing unit 370 includes a processor 480 which processes data and instructions stored in main memory 440 and/or ROM 450. The processor 480 may also process information stored on the disk 410 or CD-ROM 420. The exemplary processor 480 may be a Xeon processor from Intel of America or an Opteron processor from AMD of America. As one of ordinary skill in the art will recognize, the processor 480 may also be a Pentium processor, Core 2 Duo processor and the like. Thus, instructions corresponding to a method for gamma ray detection may be stored on any one of disk 410, CD-ROM 420, main memory 440 or ROM 450.

The computing unit 370 may also include a network interface 475, such as an Intel Ethernet PRO network interface card from Intel Corporation of America, for interfacing with a network, such as the Internet or a private network. Display controller 430 may be a NVIDIA G-Force GTX graphics adapter from NVIDIA Corporation of America for interfacing with display 385. The computing unit 370 may also include an I/O interface 490 for interfacing with a keyboard 295, pointing device 285 or other general interface 380, such as a microphone, trackball, joystick, touchscreen and the like.

Disk controller 460 interconnects disk 410, which may be a hard disk drive or FLASH memory drive, and CD-ROM 420 or a DVD drive with bus 470, which may be an ISA, ESIA, VESA, PCI, or similar for interconnecting all of the components of the computing unit 370. A description of the general features and functionality of the components of the computing unit 370 is omitted for brevity as these features are well known. Of course, other processors and hardware vendors and types known in the art may also be used, such as Freescale Cold Fire, I. MX and ARM processors from Freescale Corporation of America.

The exemplary computing unit 370 may also be implemented separately on FPGA's, ASIC's, microcontroller, PLD's or other computer-readable mediums such as an optical disk. In addition, the exemplary computing unit 370 is a hardware platform of a computing device, such as a PC, and processor 480 may be for example an Intel Pentium Processor, or any other processor known in the art. The computer-readable instructions stored on any one of the main memory 440, ROM 450, disk 410 or CD-ROM 420 may be provided as a utility application, background daemon, or component of an operating system, or combination thereof, executing in conjunction with processor 480 and an operating system such as Microsoft VISTA, UNIX, Solaris, LINUX, Apple MAC-OS and other systems known to those skilled in the art.

Main memory 440 and/or ROM 450 supports registries and the like features of the computing unit 370. As such, main memory 440 may be a random access memory (RAM), FLASH memory, EEPROM memory, or the like, while ROM 450 is Read Only Memory, such as a PROM. Further descriptions of main memory 440 and ROM 450 are omitted for brevity as such memory is well known.

Figure 5:
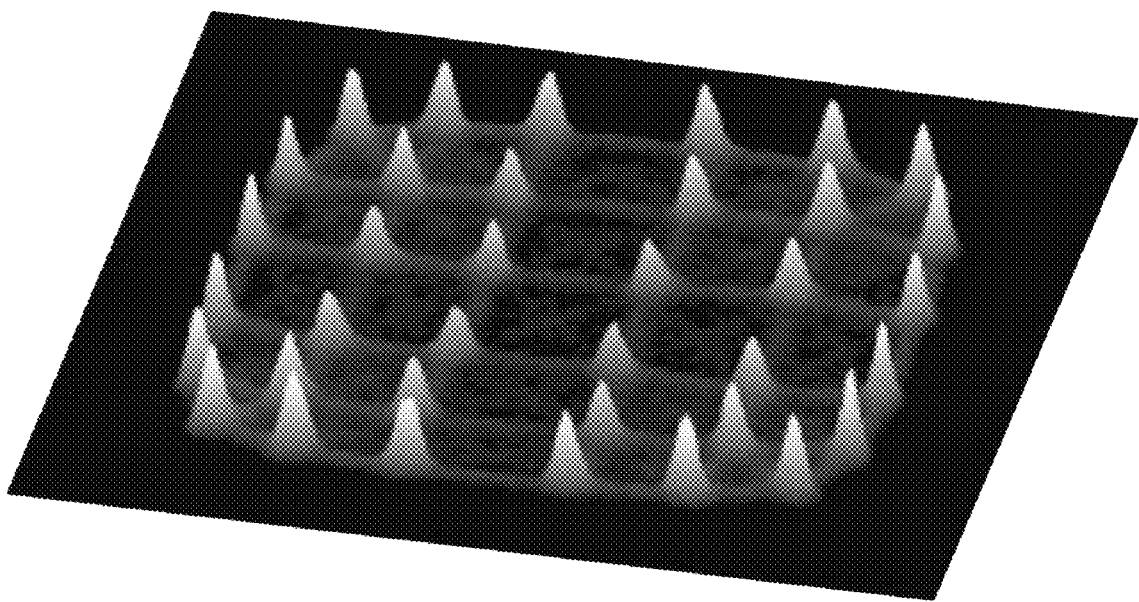
FIG. 5 illustrates a flood histogram resulting from optical multiplexing and quad-PMT read-out of a scintillator array in which the 36 peaks represent each of the 36 crystals in the scintillator array and the events that are placed between the peaks, particularly visible as lines connecting nearest-neighbors in the array, arise from events that have Compton scattered in the scintillator array.
Figure 6:
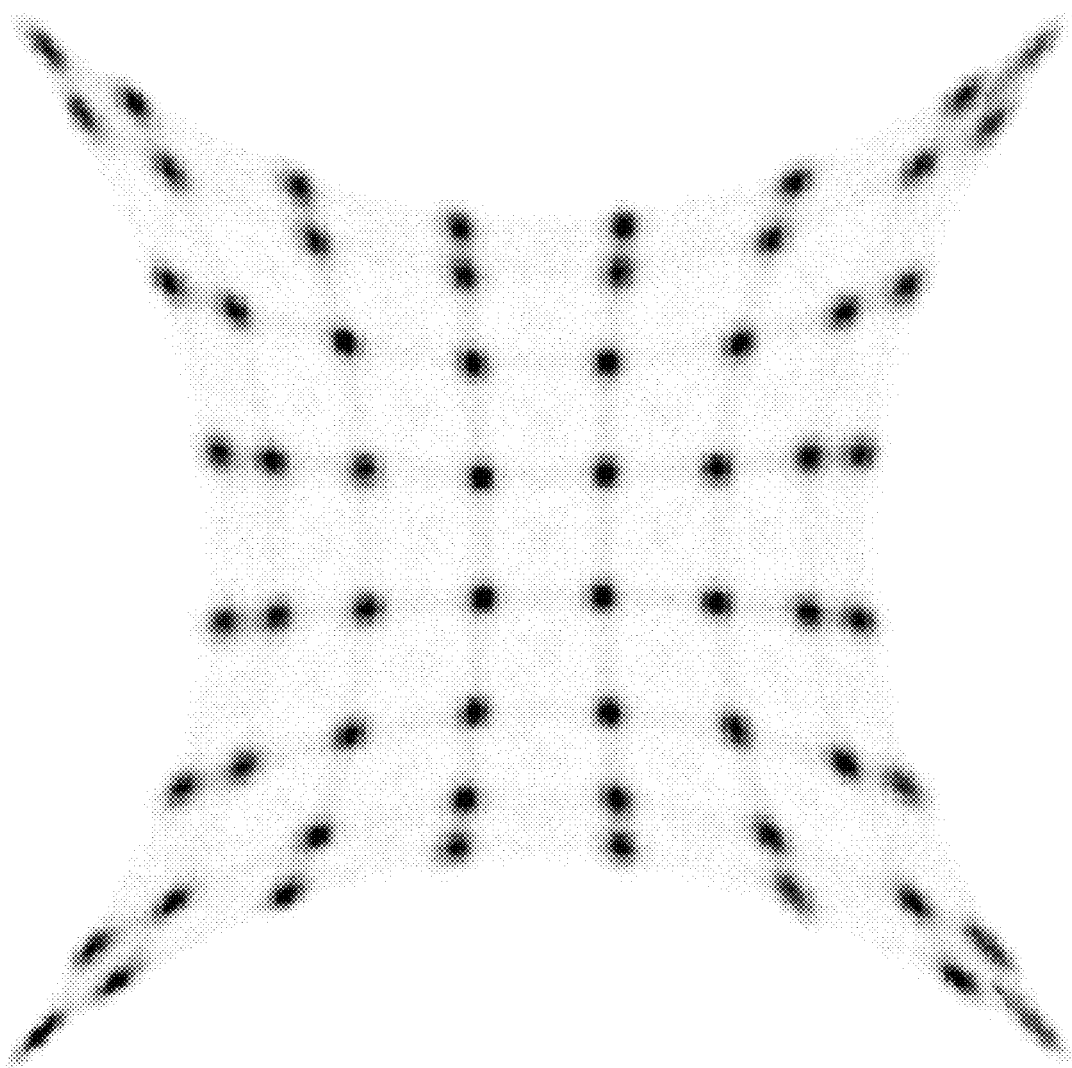
FIG. 6 illustrates a flood histogram resulting from an analog electronic multiplexing read-out of a scintillator array using a position sensitive avalanche photodiode in which the 64 peaks represent each of the crystals in the 8×8 scintillator array and the events placed between the sharp peaks result from Compton scatter within the scintillator array, wherein the pattern of lines connecting nearest neighbors is clearly evident, and results from Compton interactions that deposit energy in nearest neighbor crystal pairs.

FIGS. 5 and 6 show two flood histograms in which the presence of inter-crystal Compton scatter can clearly be identified. FIG. 5 illustrates a flood histogram resulting from optical multiplexing and quad-PMT read-out of a scintillator array in which the 36 peaks represent each of the 36 crystals in the scintillator array and the events that are placed between the peaks, particularly visible as lines connecting nearest-neighbors in the array, arise from events that have Compton scattered in the scintillator array;

FIG. 6 illustrates a flood histogram resulting from an analog electronic multiplexing read-out of a scintillator array using a position sensitive avalanche photodiode in which the 64 peaks represent each of the crystals in the 8×8 scintillator array and the events placed between the sharp peaks result from Compton scatter within the scintillator array, wherein the pattern of lines connecting nearest neighbors is clearly evident, and results from Compton interactions that deposit energy in nearest neighbor crystal pairs As a specific example, consider the case shown in FIG. 5. In this case, a 6×6 scintillator array consisting of 36 individual crystals was read-out using a quad-photomultiplier tube. Instead of reading out the array using a quad-PMT, instead imagine that it was read-out using a quad-SiPM array. Using the methods described in the conventional art, the flood-histogram in FIG. 5 would be segmented into 36 regions, with each region representing one scintillator crystal. Energy correction factors, possibly including a non-linearity correction, would then be derived and applied on a crystal-by-crystal basis. In one embodiment, the histogram is segmented into a larger number of sub-pixels (e.g., 900). A different non-linearity correction is then derived from calibration data and applied to each sub-pixel region.

In an alternative embodiment, after deriving the corrections for each sub-region from calibration data, a mathematical function is derived to cause the non-linearity correction to vary continuously as a function of position within the flood histogram. In this case, the mathematical function is considered as a way to interpolate between the centers of the regions used for the calibration.

Figure 7A:
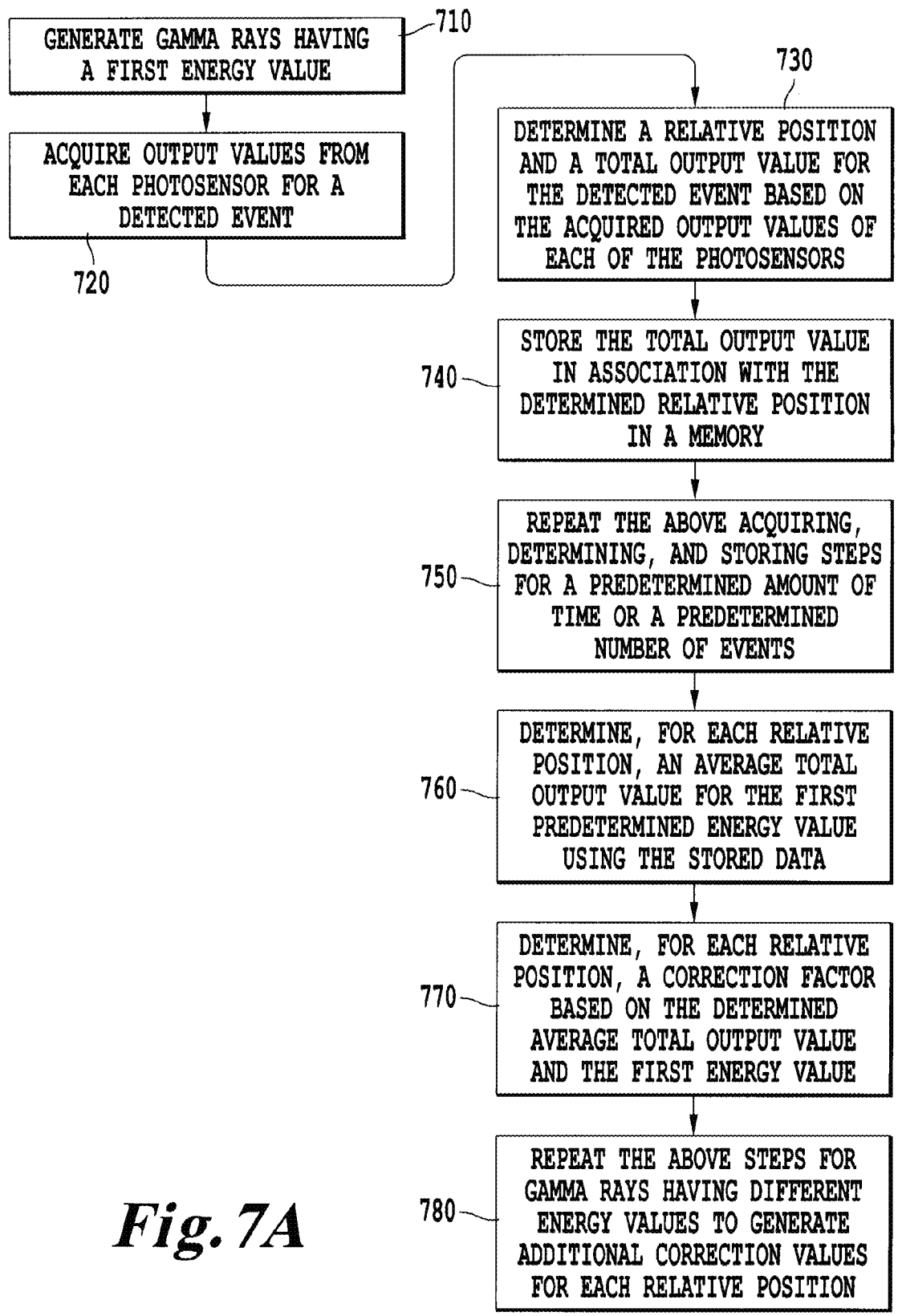
FIGS. 7A and 7B are flowcharts showing the steps in two methods disclosed herein.

FIG. 7A illustrates a method for determining a set of correction factors (calibration data) used to determine the energy of an event detected by a gamma ray detector having one or more nonlinear photosensors arranged over a scintillation array of crystal elements, the gamma ray detector using optical multiplexing or analog electronic multiplexing. The method of FIG. 7A is used to calibrate the gamma ray detector by determining a set of correction values to be used to determine the correct energy value for a detector event. In other words, an object of the method shown in FIG. 7A is to determine the nonlinear relationship between the integrated signal produced by the photosensors and the energy value of the event, e.g., as shown in FIG. 1, for each sub-pixel cell location, which is corresponds to the determined relative position of the event. The number of cell locations is greater than the number of crystals in the crystal array.

In step 710, gamma rays having a first predetermined energy value (e.g., 511 keV) are generated for detection by the gamma ray detector. Such gamma rays can originate from a $^{22}$Na, $^{68}$Ge, or $^{18}$F radioactive source, with the source activity typically in the range of tens of micro-curies to several milli-curies. The source activity is chosen to provide a high enough count rate to allow the required data to be acquired within a reasonable time (tens of minutes to a few hours), without providing such a high count rate that pile-up of events causes significant errors.

In step 720, a gamma ray strikes the array of crystal elements and generates scintillation light that is detected by one or more photosensors. The data acquisition units obtain an energy output value (in arbitrary units) for each photosensor that is triggered by the event. For example, FIG. 8A illustrates a typical pulse generated by a photosensor corresponding to a 511 keV gamma ray. As shown in FIG. 8B, the timing information can be derived from the leading edge of the pulse, while energy information is derived from the integral of the pulse.

Figure 9A:
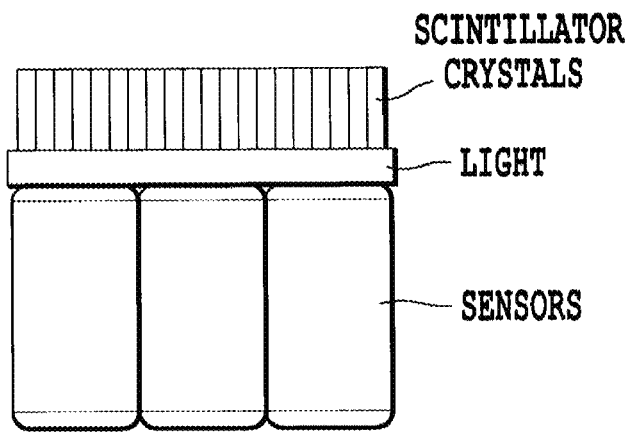
FIGS. 9A and 9B illustrate a configuration of a gamma ray detector showing the positional relationship between a crystal array, a light guide, and photosensors.
Figure 9B:
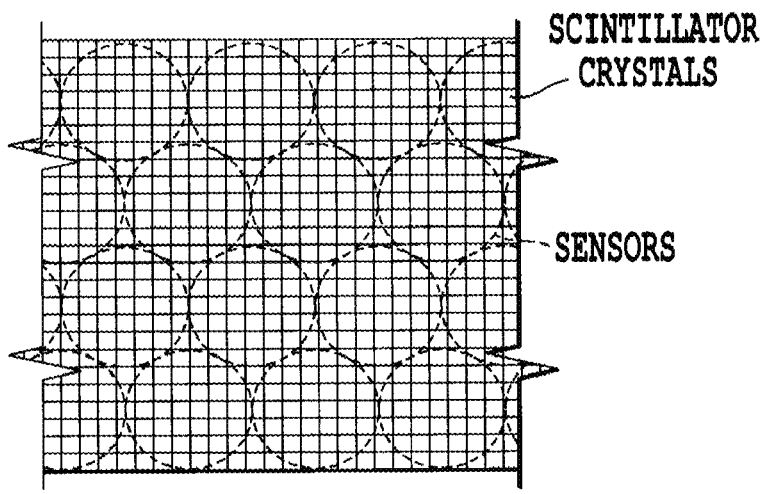

In step 730, a relative position and a total output value of the event is determined based on the acquired output value of each photosensor. FIGS. 9A and 9B illustrate one method of determining the relative position of the event. FIGS. 9A and 9B show two views of a detector illustrating the arrangement of the scintillator crystals, light guide, and photosensors.

The light guide spreads the scintillation light from a single scintillator crystal over multiple photosensors. The relative position of the event can be calculated based on the ratios of signals received by the different photosensors as follows $x = (\Sigma x_i \text{Signal}_i) / \Sigma \text{Signal}_i$ $y = (\Sigma y_i \text{Signal}_i) / \Sigma \text{Signal}_i$ where $\text{Signal}_i$ is the output signal value of the ith photosensor, and $x_i$ and $y_i$ are the positions of the center of the ith photosensor. Other algorithms can be used to determine the relative position of an event that is detected by multiple photosensors. The total energy value for the event can be computed as the sum of the signal values at each of the photosensors that received the scintillation light for the event.

In one embodiment the relative position is determined as corresponding to one of a predetermined number of cell locations, wherein the predetermined number of cell (sub-pixel) locations is greater than the number of crystal elements in the array of crystal elements.

In step 740, the total computed signal value for the event is stored in association with the determined relative position of the event.

Figure 10A:
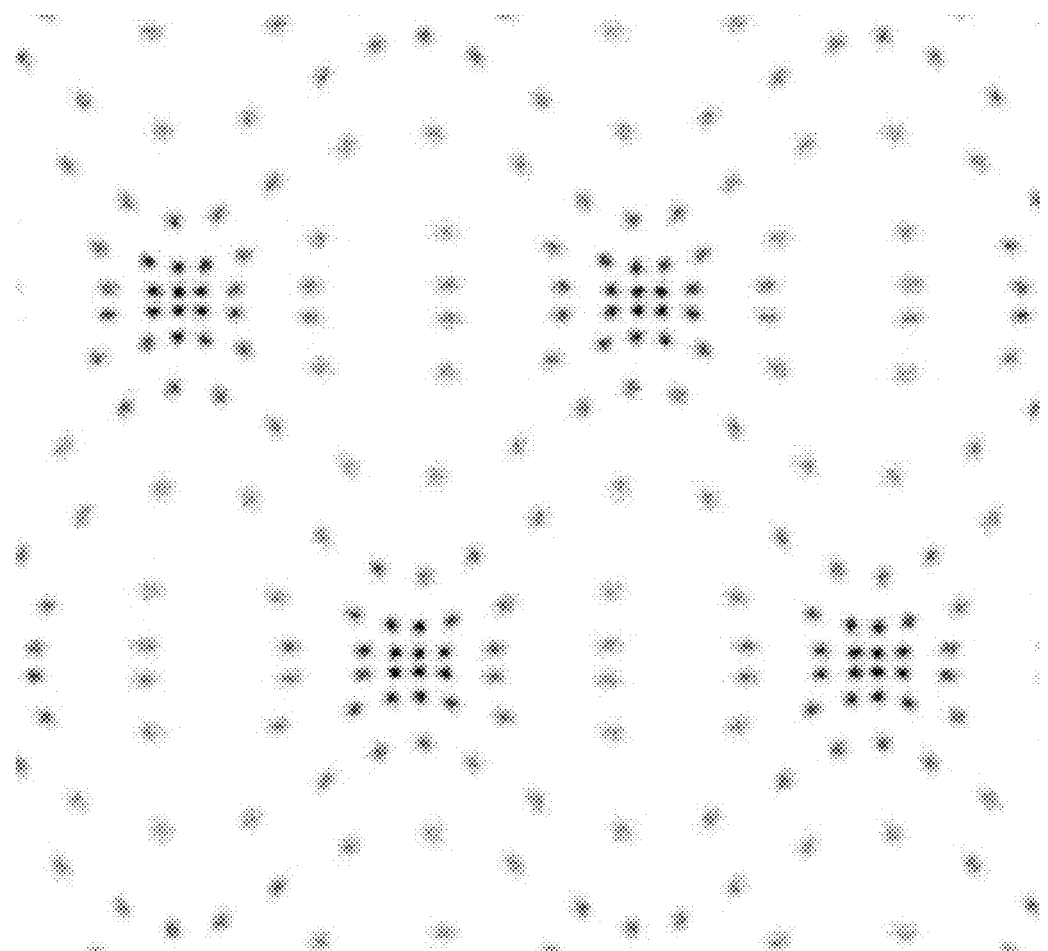
FIGS. 10A and 10B illustrate a flood histogram and a crystal ID look-up table corresponding to the flood histogram.
Figure 10B:
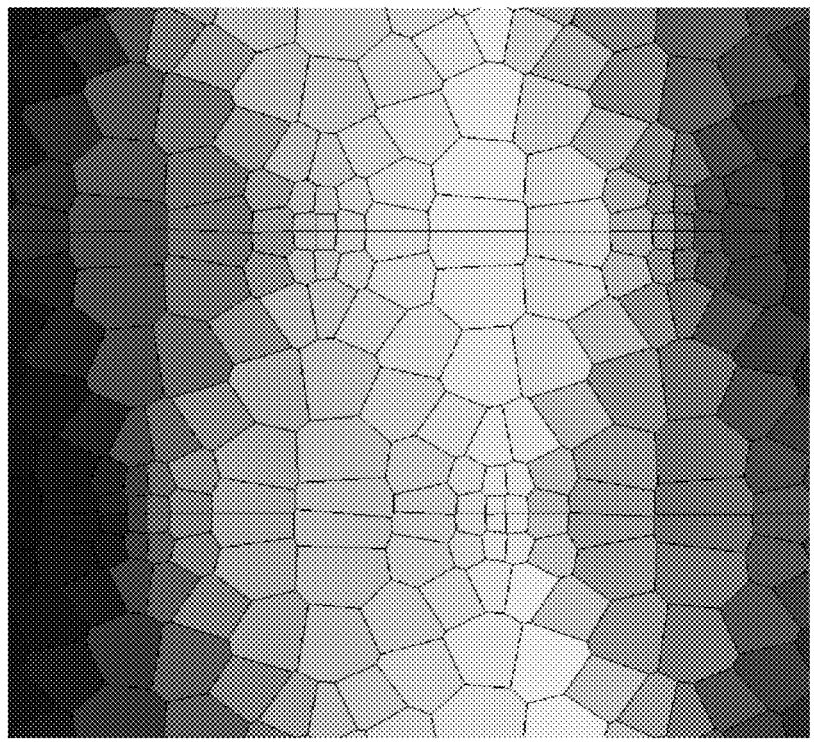

In step 750, steps 710-740 are repeated for a plurality of detector events. Conventionally, as shown in FIG. 10A, a flood histogram illustrating the frequency of the detector events is generated based on the stored data for each event. The flood histogram shows a separate peak for each crystal. Geometrical effects cause a distinct distortion pattern. As shown in FIG. 10B, the flood histogram can be used to determine the crystal of interaction for an event by segmenting the flood histogram into regions. All events falling within the same region are assigned to the same crystal. Thus, a look-up table can be generated to convert the calculated position of the event in the flood histogram to a crystal location.

In one embodiment, each region in the flood histogram of FIG. 10A is subdivided into a plurality of cells (sub-pixel regions) to determine an energy correction value for each cell.

In step 760, an average computed signal value over a plurality of events is determined for each relative position (cell location) based on the stored event data, and the determined average computed signal value is stored in association with the first predetermined energy value of the gamma rays used to generate the events.

In step 770, a correction factor is determined for each relative position based on the determined average total signal value for that relative position and the first predetermined energy value. For example, the ratio of the predetermined energy value (e.g., 511 keV) and the average total signal value for a cell location (in arbitrary units) is set as the correction value for that cell location.

In step 780, steps 710-770 are repeated for additional gamma rays having predetermined energy values, so that corresponding correction values are determined for each of the predetermined energy values, for each of the cell locations. Thus, after step 770, at the end of the calibration process, each cell (sub-pixel) location will have, for example, a set of data values $\{S_i, E_i\}$, where $S_i$ is a total signal value (in arbitrary units) and $E_i$ is an energy value (in keV). The set of data values can be used to generate a nonlinear curve relating signal value to corrected energy value for each cell location, such as shown, for example, in FIG. 1. The generated curve at each cell location can then be used to convert the signal value of an event to an energy value, thus compensating for the nonlinearity of the SiPM response.

As discussed above, in another embodiment, after deriving the corrections for each cell location from calibration data, a mathematical function is derived to cause the non-linearity correction to vary continuously as a function of position within the flood histogram. In this case, the mathematical function is considered as a way to interpolate between the centers of the regions used for the calibration.

In an alternative embodiment, gamma rays having different energy levels are generated simultaneously rather than sequentially. Further, other features that occur at known energies in the acquired spectra (e.g., Compton edges and back-scatter peaks) can also be used to calibrate the nonlinear response of the detector using the above-described steps.

Figure 7B:
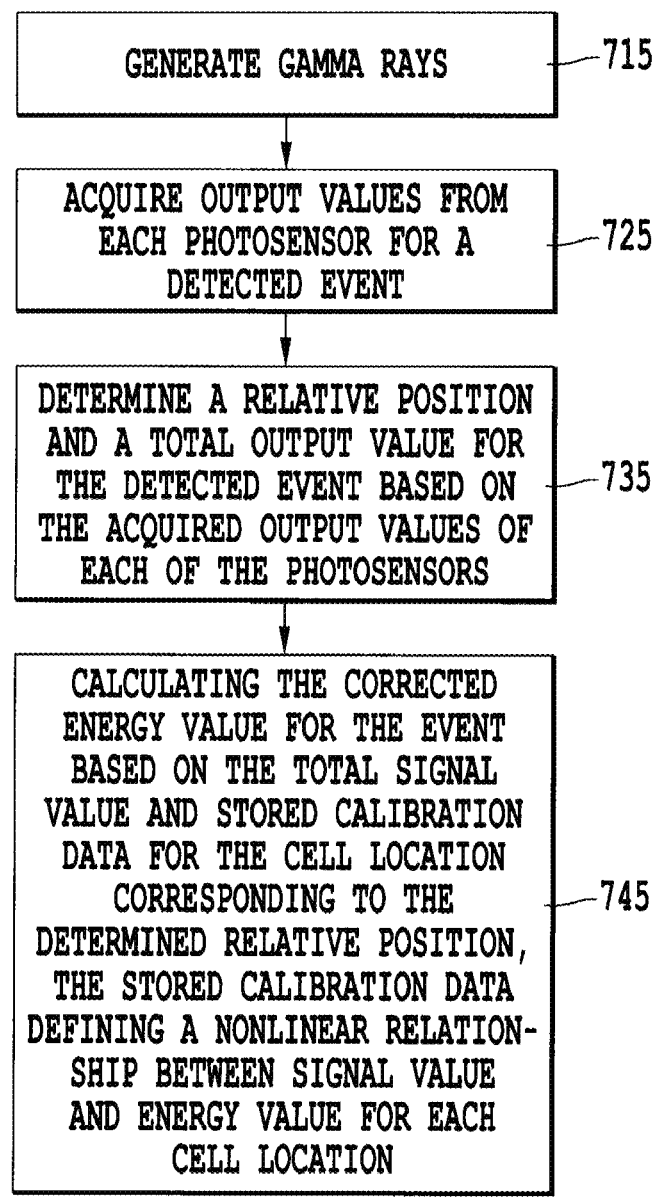

In another embodiment, as shown in FIG. 7B, the correction factors (calibration data) obtained through the method shown in FIG. 7A are used to correct energy values of events.

In step 715, gamma rays are generated for detection by the gamma ray detector.

In step 725, a gamma ray strikes the array of crystal elements and generates scintillation light that is detected by one or more photosensors. The data acquisition units obtain an energy output value (in arbitrary units) for each photosensor that is triggered by the event.

In step 735, a relative position and a total output value of the event is determined based on the acquired output value of each photosensor, as discussed above. The relative position is converted to a corresponding cell location out of the number of cell locations for which calibration data has been obtained. The number of cell (sub-pixel) locations is greater than the number of crystal elements in the array of crystal elements.

In step 745, the corrected energy value for the event is calculated based on the total signal value and stored calibration data for the cell location corresponding to the determined relative position, the stored calibration data defining a nonlinear relationship between signal value and energy value for each cell location. For example, the calibration data effectively defines a nonlinear curve relating signal value and energy value. In one embodiment, the total signal value is multiplied by a correction value using the nonlinear curve to obtain the corrected energy value. As one of ordinary skill in the art will recognize, additional gain or offset corrections could be applied to the signals prior to the application of embodiments described herein without departing from the scope of the embodiments.

The advantage over the convention systems is that the embodiments described herein provide better non-linearity correction, which results in improved energy resolution. For PET, improved energy resolution can be translated into reduced scatter fraction, and, ultimately, improved image quality.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method for determining correction factors used to determine energy of an event detected by a gamma ray detector having at least one nonlinear photosensor arranged over a scintillation array of crystal elements, the gamma ray detector using optical multiplexing or analog electronic multiplexing, the method comprising:

(a) generating gamma rays having a first predetermined energy value;

(b) acquiring, for each of the at least one nonlinear photosensor, at least one output value generated by the at least one nonlinear photosensor in response to receiving scintillation light emitted by at least one crystal in the array of crystal elements in response to arrival of one of the generated gamma rays, which signifies an event;

(c) determining a relative position and a total signal value of the event based on the acquired at least one output value of each of the at least one nonlinear photosensor, the relative position being one of a predetermined number of cell locations, the predetermined number of cell locations being greater than a number of crystal elements in the array of crystal elements;

(d) storing the total signal value in association with the determined cell location;

(e) repeating the acquiring, determining, and storing steps for a plurality of events to generate stored event data;

(f) determining, for each cell location, an average total signal value for the first predetermined energy value based on the stored event data; and (g) determining, for each cell location, a correction factor based on the determined average total signal value and the first predetermined energy value.

2. The method of claim 1, further comprising:

generating second gamma rays having a second predetermined energy value;

repeating steps (a)-(g) to determine, for each cell location, a second correction factor corresponding to the second predetermined energy value; and storing, for each cell location, each determined second correction factor in association with the corresponding second predetermined energy value.

3. The method of claim 2, further comprising:

determining, for each cell location, a nonlinear relationship between signal value and energy value, based on the stored second correction factors.

4. The method of claim 1, wherein the step of determining the relative position comprises:

determining one of the predetermined number of cell locations to correspond to the relative position.

5. The method of claim 1, wherein the step of determining the relative position comprises:

calculating a weighted average based on x-y positions of each of the at least one nonlinear photosensor that receives the scintillation light corresponding to the event, the average being weighted by the corresponding acquired output value of each of the at least one nonlinear photosensor that receives the scintillation light corresponding to the event.

6. The method of claim 1, wherein the step of determining the correction value comprises:

determining the correction value corresponding to the first predetermined energy value for each cell location as a ratio of the first predetermined energy value and the determined average total signal value for the cell location.

7. The method of claim 1, wherein the at least one nonlinear photosensor includes at least one silicon photomultiplier.

8. A system for determining correction factors used to determine energy of an event detected by a gamma ray detector, comprising:

the gamma ray detector having at least one nonlinear photosensor arranged over a scintillation array of crystal elements, the gamma ray detector using optical multiplexing or analog electronic multiplexing;

means for generating gamma rays having a first predetermined energy value;

acquisition units to acquire, for each of the at least one nonlinear photosensor, at least one output value generated by the at least one nonlinear photosensor in response to receiving scintillation light emitted by at least one crystal in the array of crystal elements in response to arrival of one of the generated gamma rays, which signifies an event;

a data processing unit configured to determining a relative position and a total signal value of the event based on the acquired at least one output value of each of the at least one nonlinear photosensor, the relative position being one of a predetermined number of cell locations, the predetermined number of cell locations being greater than a number of crystal elements in the array of crystal elements; and a memory storing the total signal value in association with the determined cell location, wherein the acquisition unit acquires signal values for a plurality of events, and the data processing unit is configured to determining a relative position and a total signal value of each event for storage in the memory; and the data processing unit is configured to determine, for each cell location, an average total signal value for the first predetermined energy value based on the stored event data, and to determine, for each cell location, a correction factor based on the determined average total signal value and the first predetermined energy value.

9. A computer-readable medium storing a computer program, which when executed by a computer, causes the computer to determine correction factors used to determine energy of an event detected by a gamma ray detector having at least one nonlinear photosensor arranged over a scintillation array of crystal elements, the gamma ray detector using optical multiplexing or analog electronic multiplexing, the program causing the computer to perform the steps of:

receiving, for each of the at least one nonlinear photosensor, at least one output value generated by the at least one nonlinear photosensor in response to receiving scintillation light emitted by at least one crystal in the array of crystal elements in response to arrival of a gamma ray having a first predetermined energy value, which signifies an event;

determining a relative position and a total signal value of the event based on the acquired at least one output value of each of the at least one nonlinear photosensor, the relative position being one of a predetermined number of cell locations, the predetermined number of cell locations being greater than a number of crystal elements in the array of crystal elements;

storing the total signal value in association with the determined cell location;

repeating the receiving, determining, and storing steps for a plurality of events to generate stored event data;

determining, for each cell location, an average total signal value for the first predetermined energy value based on the stored event data; and determining, for each cell location, a correction factor based on the determined average total signal value and the first predetermined energy value.

10. A method for determining a corrected energy value corresponding to an event detected by a gamma ray detector having at least one nonlinear photosensor arranged over a scintillation array of crystal elements, comprising:

generating a plurality of gamma rays;

acquiring, for each of the at least one nonlinear photosensor, at least one output value generated by the at least one nonlinear photosensor in response to receiving scintillation light emitted by at least one crystal in the array of crystal elements in response to arrival of one of the generated gamma rays, which signifies an event;

determining a relative position and a total signal value of the event based on the acquired at least one output value of each of the at least one nonlinear photosensor, the relative position being one of a predetermined number of cell locations, the predetermined number of cell locations being greater than a number of crystal elements in the array of crystal elements; and calculating the corrected energy value for the event based on the total signal value and stored calibration data for the cell location corresponding to the determined relative position, the stored calibration data defining a nonlinear relationship between signal value and energy value for each cell location.

11. The method of claim 10, wherein the step of determining the relative position comprises:

determining one of the predetermined number of cell locations to correspond to the relative position.

12. The method of claim 10, wherein the step of determining the relative position comprises:

calculating a weighted average based on x-y positions of each of the at least one nonlinear photosensor that receives the scintillation light corresponding to the event, the average being weighted by the corresponding acquired output value of each of the at least one nonlinear photosensor that receives the scintillation light corresponding to the event.

13. The method of claim 10, wherein the calculating step comprises:

calculating the corrected energy value for the event by multiplying the total signal value of the event by a correction value obtained from the stored calibration data for the determined cell location of the event.

14. The method according to claim 10, wherein the gamma ray detector is included in a time-of-flight positron emission tomography scanner.

15. A system for determining a corrected energy value corresponding to an event detected by a gamma ray detector, comprising:

the gamma ray detector having at least one nonlinear photosensor arranged over a scintillation array of crystal elements;

means for generating a plurality of gamma rays;

acquisition units to acquire, for each of the at least one nonlinear photosensor, at least one output value generated by the at least one nonlinear photosensor in response to receiving scintillation light emitted by at least one crystal in the array of crystal elements in response to arrival of one of the generated gamma rays, which signifies an event; and a data processing unit configured to (1) determine a relative position and a total signal value of the event based on the acquired at least one output value of each of the at least one nonlinear photosensor, the relative position being one of a predetermined number of cell locations, the predetermined number of cell locations being greater than a number of crystal elements in the array of crystal elements, and (2) calculate the corrected energy value for the event based on the total signal value and stored calibration data for the cell location corresponding to the determined relative position, the stored calibration data defining a nonlinear relationship between signal value and energy value for each cell location.

16. A computer-readable medium storing a computer program, which when executed by a computer, causes the computer to determine a corrected energy value corresponding to an event detected by a gamma ray detector having at least one nonlinear photosensor arranged over a scintillation array of crystal elements, the program causing the computer to perform the steps of:

receiving, for each of the at least one nonlinear photosensor, at least one output value generated by the at least one nonlinear photosensor in response to receiving scintillation light emitted by at least one crystal in the array of crystal elements in response to arrival of a gamma ray, which signifies an event;

determining a relative position and a total signal value of the event based on the received at least one output value of each of the at least one nonlinear photosensor, the relative position being one of a predetermined number of cell locations, the predetermined number of cell locations being greater than a number of crystal elements in the array of crystal elements; and calculating the corrected energy value for the event based on the total signal value and stored calibration data for the cell location corresponding to the determined relative position, the stored calibration data defining a nonlinear relationship between signal value and energy value for each cell location.

17. A method for determining correction factors used to determine energy of an event detected by a gamma ray detector having at least one nonlinear photosensor arranged over a scintillation array of crystal elements, the gamma ray detector using optical multiplexing or analog electronic multiplexing, the method comprising:

(a) generating gamma rays having a first predetermined energy value;

(b) acquiring, for each of the at least one nonlinear photosensor, at least one output value generated by the at least one nonlinear photosensor in response to receiving scintillation light emitted by at least one crystal in the array of crystal elements in response to arrival of one of the generated gamma rays, which signifies an event;

(c) determining a relative position and a total signal value of the event based on the acquired at least one output value of each of the at least one nonlinear photosensor;

(d) storing the total signal value in association with the determined relative position;

(e) repeating the acquiring, determining, and storing steps for a plurality of events to generate stored event data; and (f) determining, based on the stored event data and the first predetermined energy value, parameters of a mathematical correction function that varies continuously as a function of position within the array of crystal elements, the mathematical correction function representing a spatial variation in the total signal value of the acquired events.

18. The method of claim 17, further comprising:

determining, for each event, an energy of the event using the determined mathematical correction function and the determined relative position of the event.

* * * * *